April 9, 1940. H. M. GUINOT 2,196,554
PROCESS FOR THE MANUFACTURE OF PRIMARY HYDROXYALKYLAMINES
Filed April 14, 1938
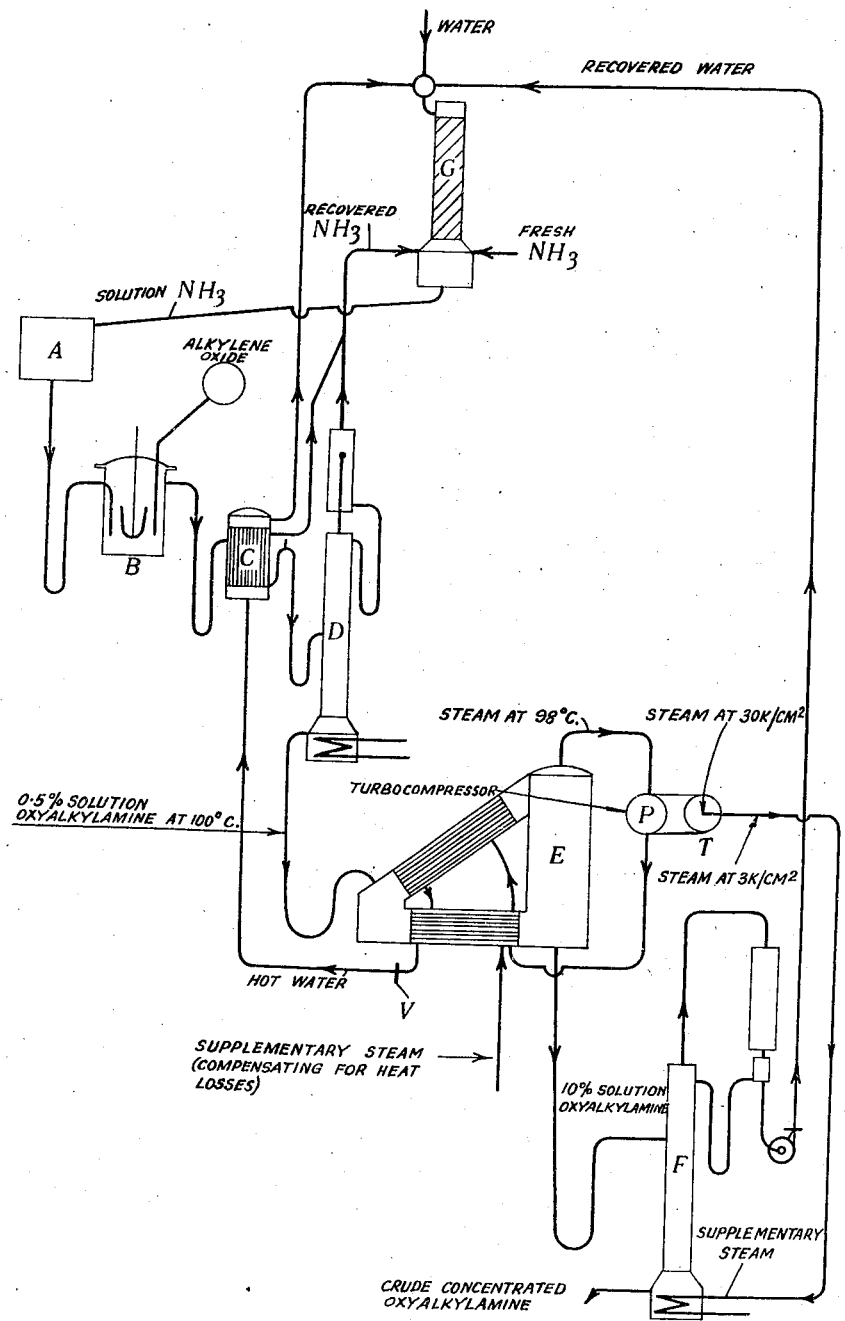

Patented Apr. 9, 1940

2,196,554

UNITED STATES PATENT OFFICE 2,196,554

PROCESS FOR THE MANUFACTURE OF PRIMARY HYDROXYALKYLAMINES

Henri Martin Guinot, Niort, Deux-Sevres, France, assignor to les Usines de Melle, Melle, Deux-Sevres, France, a corporation of France Application April 14, 1938, Serial No. 202,086
In France April 16, 1937

11 Claims. (Cl. 260—584)

It is known that the action of alkylene oxides on aqueous solutions of ammonia gas result in the formation of a mixture of mono-, di-, and tri-hydroxyalkylamines. Since 1897 certain authors have already reported that the relative proportions of these three hydroxyalkylamines depend upon the relative quantities of alkylene oxide and ammonia (see for example: Knorr, B. 30-903, 1897).

Now the mono-hydroxyalkylamines are of particular importance because they can be used for various industrial processes; for example they are useful as emulsifying agents in the manufacture of soaps and cosmetics and also in the textile industry so that attempts have already been made to obtain them with the exclusion of the secondary or tertiary hydroxyalkylamines. In particular it has been sought to solve the problem of improving the yield of mono-hydroxyalkylamines by increasing the quantity of ammonia gas used in the reaction, for a given weight of alkylene oxide.

It is for this reason that certain previous proposals specify the use of one part of ethylene oxide for 2.4 parts of ammonia in aqueous solution at 10° C. or one part of ethylene oxide for 7.7 to 19.3 of ammonia at temperatures of 30° to 95°.

But according to the indications given in these previous proposals themselves, yields of more than 65% to 80% of mono-hydroxyalkylamines are not obtained under these conditions.

To improve these results the applicant has used a still larger excess of ammonia in relation to the alkylene oxide used in the reaction, for example, one part of alkylene oxide for 50 or 100 parts by weight of ammonia, which allows mono-hydroxyalkylamine to be obtained with yields of 90% to 95%. However the realisation of these favourable conditions raises new difficulties in that if the reaction is carried out at atmospheric pressure with aqueous ammoniacal solutions at 20%, for example, it is necessary to use 200 kg. of water in the reaction for 1 kg. of alkylene oxide. This implies a large expenditure of heat since it is necessary to separate by distillation 200 kg. of water from the hydroxyalkylamine formed. Such a process would be inapplicable in practice without the use of means for permitting a considerable reduction in this expenditure of heat.

Now it has been found that the presence of the hydroxyalkylamines in the water only raises the boiling point of this latter very slightly. It has been observed for example that: the boiling point at a pressure of

| | °C. |
|---|---|
| 760 mm. of Hg of a solution of 9.8% of mono-ethanolamine is only | 101.5 |
| That of an aqueous solution of 17.5% is only | 102.5 |
| That of an aqueous solution of 22.4% is only | 103 |
| That of an aqueous solution of 30% is only | 103.5 |
| That of an aqueous solution of 41.5% is only | 106 |
| That of an aqueous solution of 50.5% is only | 108.5 |

In connection with these figures it is to be noted that in concentrating dilute solutions of hydroxyalkylamines up to 30%, for example, very much more water has to be driven off, and hence much more heat has to be used, than in concentrating a 30% solution to give a pure product. For example, starting with 200 kgs. of a solution of 0.5% it is necessary first to distil off 196.7 kg. of water to get a solution at 30%, whereas it is sufficient next to distil off 2.3 kg. of water to produce a pure product.

From the foregoing it is evident that if a heat interchanger operating with a temperature difference of 2° C. is employed and supplied with steam at 105.5° C. it will be possible to concentrate dilute solutions of hydroxyalkylamines up to about 30% and furthermore that if the steam produced during this concentration has its temperature and pressure increased to such an extent that it will condense at 105.5° C., it can be fed back to the heat interchanger to concentrate further amounts of dilute solution. Now very much less energy is needed to raise unit mass of saturated steam at about 100° C. and atmospheric pressure to such a pressure and temperature that it will condense at 105.5° C. than is required to transform unit mass of water at 100° C. into steam at 100° C. Hence a considerable saving in heat is effected by feeding back to the heat interchanger. In other words heat economy is effected by raising the pressure and thermal potential of the steam produced in the distillation of one portion of the dilute aqueous solution of the product, to such an extent that it gives up its latent heat of vaporisation at a temperature high enough (in a heat interchanger operating as indicated above) to distil in the same way a succeeding equal portion of the solution of the product.

The increase in thermal potential and pressure of the steam evolved during distillation is produced by adiabatic compression conveniently in a turbo-compressor. Assuming an efficiency of 50% for the turbo-compressor the following results are obtainable:

1 kg. of live steam (30 kg./cm.² at 400°) allows 7 kg. of steam to be raised from 100° to 107.5° C. and a pressure of about 300 gms./cm.².

1 kg. of live steam (30 kg./cm.² at 400°) allows 5.2 kg. of steam to be raised from 100° to 110° C. and a pressure of about 500 gms./cm.².

1 kg. of live steam (30 kg./cm.² at 400°) allows 4.2 kg. of steam to be raised from 100° to 112.5° C. and a pressure of about 600 gms./cm.².

1 kg. of live steam (30 kg./cm.² at 400°) allows 3.8 kg. of steam to be raised from 100° to 115° C. and a pressure of about 750 gms./cm.².

Thus according to the present invention there is provided a process for the manufacture of hydroxyalkylamines by the action of ammonia on an alkylene oxide in which at least 30 parts by weight of ammonia are used for each part by weight of alkylene oxide and that the vapours emitted during the concentration of one portion of the dilute solution of oxyalkylamine are used for concentrating the succeeding portion of such solution, after their pressure and temperature has been increased by adiabatic compression to such an extent that they condense at a temperature 5 to 10° C. above the temperature at which they condense at normal pressure.

The heat interchanger and turbo-compressor thus form one example of the means which make the process described above for producing hydroxyalkylamines, capable of industrial use, by reducing the expenditure of heat.

Industrially the costs of the separation of the hydroxyalkylamines can be diminished about five times according to the present invention, these costs constituting an important part of the total manufacturing cost.

The distillation of the hydroxyalkylamine solution is effected after the excess of ammonia has been separated therefrom. This removal of gas is effected at least in part by using the hot water condensed from the heating steam in the distillation apparatus. The ammonia evolved is dissolved in water and again enters the reaction; it thus circulates in a closed cycle and it is sufficient to replenish it according to the quantity of ammonia fixed in the form of hydroxyalkylamine. The calories given up by the dissolving of the ammonia can similarly serve for removing gas from the solution, if a convenient heat interchanger is available.

The present process allows the reaction to take place at normal pressure as well as at higher pressure. Working under pressure allows more concentrated solutions of ammonia gas to be used and consequently reduces the quantity of water to be distilled off.

The following description, supported by the accompanying drawing, will make the mechanism of the invention understood: A tank A holding the ammoniacal solution continuously feeds a reaction tank B. Alkylene oxide is fed in such a manner that the quantity of oxide is 50 to 100 times smaller than the quantity of ammonia. The product of the reaction, which is first partly freed from gas in a preheater C and then completely freed from gas in a column D, flows away continuously. The ammonia removed is used, replished by a fresh ammonia and passed to a tower G, for the preparation of the ammoniacal solutions necessary for the operation. If it is desired, the considerable amount of heat given up by the dissolution of the ammonia (8.5 cal. per mol. $NH_3$) may be utilised to assist in removing gas from the solution in a suitable heat interchanger. From the bottom of D there is withdrawn a solution at 100° C. of hydroxyalkylamine at 0.5%. This solution is passed into a heat interchanger or boiler E where it is concentrated up to 10–20% by heating to 102°–103°. The vapours emitted at 98°–99°, under a slight vacuum created by the aspiration of a turbo-compressor PT, are reheated up to 105° and compressed by adiabatic compression and serve while under pressure for heating the solution. If necessary means may be provided for supplying a small amount of additional steam to compensate for heat losses in the compressed steam occurring before it is condensed in the boiler E. The water of condensation from this vapour leaves the boiler E through the throttle valve V and is used at atmospheric pressure for the partial removal of gas from the ammoniacal solution. The solution of hydroxyalkylamine concentrated to 10–20% which is withdrawn from the boiler E, is rectified (if necessary under a slight vacuum) in the column F, which is partly heated by the exhaust steam of the turbine of the turbo-compressor PT. At the base of F the crude hydroxyalkylamine is withdrawn. The distilled water from the column F as well as that which results from the heating steam of the boiler E, both of which may contain some traces of hydroxyalkylamine, return to the circuit after having been saturated with ammonia.

*Example I*

A container of 500 litres capacity is continuously fed with 250 kg. per hour of aqueous solution of ammonia at 20% and 1 kg. per hour of ethylene oxide. The temperature is maintained at 15° during the whole of the operation and the work is done at atmospheric pressure. The product freed from gas is first of all constructed with the object of eliminating 190 kg. of water. The steam produced by this distillation is taken up again by a turbo-compressor and compressed in such a manner that its temperature rises to 105°, it then serves under this pressure for heating the boiler where concentration takes place. A distillation and a rectification of the concentrated solution allow 1.35 kg. of mono-ethanolamine to be obtained, which is a yield of 95%, the remainder of the ethylene oxide is recovered in the form of diethanolamine.

*Example II*

A tank of 500 litres is fed continuously with 200 kg. per hour of aqueous solution of ammonia at 25% and 1 kg. per hour of propylene oxide, which makes the relation oxide—$NH_3$—water equal to 1–50–150. The reaction is carried out at 30° and at ordinary pressure. After removing the gas the solution is concentrated in such a manner that 140 kg. of water vapour are distilled off, which serve for heating the concentration boiler after the temperature has been raised to 107° by compression. Mono-propanolamine is obtained with the yield of 90%.

*Example III*

A tank of 250 litres is continuously filled, at a pressure of 4 kg./cm.², with 100 kg. of aqueous solution of ammonia at 50% and 1 kg. of ethylene oxide. The reaction is carried out at 25°, the product of the reaction is continuously flowed into a tank also maintained under a pressure of 4 kg./cm.², and heated to 110°, in which the removal of gas takes place; the ammonia removed is used to saturate the solution under a pressure of 4 kg./cm.², the replenishment of ammonia being provided by a flask of liquid ammonia so that the operation can be carried out without a compressor.

After removing the gas the pressure on the solution is released and it is concentrated. The steam emitted by this concentration is re-heated by compression and serves to heat the concentration apparatus. A final distillation permits monoethanolamine to be obtained.

What I claim is:

1. In the manufacture of hydroxyalkylamines by reacting an alkylene oxide with an ammoniacal solution, the steps of adjusting the relative proportions of said reactants to be at least thirty parts by weight of ammonia to one part by weight of alkylene oxide, and removing water from the solution of the product in a continuous manner by recycling steam evolved therefrom, after its pressure and temperature have been raised to such a point by adiabatic compression that it will condense at a temperature of 5 to 10° C. above its normal boiling point.

2. In the manufacture of mono-hydroxyalkylamines by allowing an aqueous solution of ammonia to react with the alkylene oxide, the steps of adjusting the relative proportions of said reactants to be at least thirty parts by weight of ammonia to one part by weight of alkylene oxide, passing a quantity of the crude solution of the product to a heat interchanger, boiling said solution in said interchanger to produce a concentration of about 10%, passing steam evolved during this concentration through a turbo-compressor where it is adiabatically compressed to such a pressure and temperature that it condenses at a temperature 5 to 10° C. above its normal boiling point, and passing said steam back to said heat interchanger to effect concentration of further quantities of crude solution of said product.

3. In the manufacture of hydroxyalkylamines by reacting an alkylene oxide with an ammoniacal solution, the steps of adjusting the relative proportions of said reactants to be at least thirty parts by weight of ammonia to one part by weight of alkylene oxide, removing water from the solution of the product in a continuous manner by recycling steam evolved therefrom after its pressure and temperature have been raised to such a point by adiabatic compression that it will condense at a temperature of 5 to 10° C. above its normal boiling point and using the water condensed from said recycled steam to remove ammonia for the crude solution after reaction.

4. In the manufacture of mono-hydroxyalkylamines by allowing an aqueous solution of ammonia to react with the alkylene oxide, the steps of adjusting the relative proportions of said reactants to be at least thirty parts by weight of ammonia to one part by weight of alkylene oxide, passing a quantity of the crude solution of the product to a heat interchanger, boiling said solution in said interchanger to produce a concentration of about 10%, passing steam evolved during this concentration through a turbo-compressor where it is adiabatically compressed to such a pressure and temperature that it condenses at a temperature 5 to 10° C. above its normal boiling point, passing said steam back to said heat interchanger to effect concentration of further quantities of crude solution of said product, using the water condensed from said steam to remove ammonia from the crude solution of the product after reaction, redissolving said ammonia in water and also using the latent heat of said redissolved ammonia to assist in removing ammonia from said crude solution of the product.

5. In the manufacture of hydroxyalkylamines by reacting under pressure an alkylene oxide with an ammoniacal solution, the steps of adjusting the relative proportions of said reactants to be at least thirty parts by weight of ammonia to one part by weight of alkylene oxide, and removing water from the solution of the product in a continuous manner by recycling steam evolved therefrom after its pressure and temperature have been raised to such a point by adiabatic compression that it will condense at a temperature of 5 to 10° C. above its normal boiling point.

6. In the manufacture of mono-hydroxyalkylamines by allowing an aqueous solution of ammonia to react under pressure with the alkylene oxide, the steps of adjusting the relative proportions of said reactants to be at least thirty parts by weight of ammonia to one part by weight of alkylene oxide, passing the crude solution of the product to a heat interchanger, boiling said solution in said interchanger to produce a concentration of about 10%, passing steam evolved during this concentration through a turbo-compressor where it is adiabatically compressed to such a pressure and temperature that it condenses at a temperature 5 to 10° C. above its normal boiling point, and passing said steam back to said heat interchanger to effect concentration of further quantities of crude solution of said product.

7. In the manufacture of hydroxyalkylamines by reacting under pressure an alkylene oxide with an ammoniacal solution, the steps of adjusting the relative proportions of said reactants to be at least thirty parts by weight of ammonia to one part by weight of alkylene oxide, removing water from the solution of the product in a continuous manner by recycling steam evolved therefrom after its pressure and temperature have been raised to such a point by adiabatic compression that it will condense at a temperature of 5 to 10° C. above its normal boiling point and using the water condensed from said recycled steam to remove ammonia from the crude solution after reaction.

8. In the manufacture of mono-hydroxyalkylamines by allowing an aqueous solution of ammonia to react under pressure with the alkylene oxide, the steps of adjusting the relative proportions of said reactants to be at least thirty parts by weight of ammonia to one part by weight of alkylene oxide, passing the crude solution of the product to a heat interchanger, boiling said solution in said interchanger to produce a concentration of about 10%, passing steam evolved during this concentration through a turbo-compressor where it is adiabatically compressed to such a pressure and temperature that it condenses at a temperature 5 to 10° C. above its normal boiling point, passing said steam back to said heat interchanger to effect concentration of further quantities of crude solution of said product, using the water condensed from said steam to remove ammonia from the crude solution of the product after reaction, redissolving said ammonia in water and also using the latent heat of said redissolved ammonia to assist in removing ammonia from said crude solution of the product.

9. In a continuous process for the manufacture of mono-hydroxyalkylamines which comprises reacting alkylene oxide with an aqueous solution of ammonia, the steps of maintaining the temperature between 10 and 30° C. during said reaction and the relative quantities of ammonia and alkylene oxide at thirty to one by weight, continuously removing the solution containing the hydroxyalkylamine product to the extent of .05% and excess ammonia, from the zone of said reaction, passing said solution to a heat interchanger to remove part of said ammonia, passing said solution from said heat interchanger to a column where the temperature of said solution is raised to 100° C. and the remainder of the excess ammonia is driven off, passing said solution from said column to a heat interchanger where its concentration is raised to 10 to 30%, passing concentrated solution from said second-mentioned heat interchanger to a rectifying column to obtain crude concentrated hydroxyalkylamine, removing the steam from said second-mentioned heat interchanger, passing said steam through a turbo-compressor where it is adiabatically compressed to increase its temperature and pressure to such an extent that it will condense at 5 to 10° C. above its boiling point, passing said heated and compressed steam back to said second-mentioned heat interchanger to concentrate further solutions of product and removing the water condensed from said steam from said second-mentioned heat interchanger through a throttle valve and employing it to assist in the removal of ammonia in said first-mentioned heat interchanger.

10. In a continuous process for the manufacture of mono-hydroxyalkylamines which comprises reacting alkylene oxide with an aqueous solution of ammonia, the steps of maintaining the temperature between 10 and 30° C. during said reaction and the relative quantities of ammonia and alkylene oxide at thirty to one by weight, continuously removing the solution containing the hydroxyalkylamine product to the extent of .05% and excess ammonia, from the zone of said reaction, passing said solution to a heat interchanger to remove part of said ammonia, passing said solution from said heat interchanger to a column where the temperature of said solution is raised to 100° C. and the remainder of the excess ammonia is driven off, passing said solution from said column to a heat interchanger where its concentration is raised to 10 to 30%, passing concentrated solution from said second-mentioned heat interchanger to a rectifying column to obtain crude concentrated hydroxyalkylamine, removing the steam from said second-mentioned heat interchanger, passing said steam through a turbo-compressor where it is adiabatically compressed to increase its temperature and pressure to such an extent that it will condense at 5 to 10° C. above its boiling point, passing said heated and compressed steam back to said second-mentioned heat interchanger to concentrate further solutions of product and removing the water condensed from said steam from said second-mentioned heat interchanger through a throttle valve, employing it to assist in the removal of ammonia in said first-mentioned heat interchanger and employing the exhaust steam from said turbo-compressor to assist in the concentration of the hydroxyalkylamine in said rectifying column.

11. In a continuous process for the manufacture of mono-hydroxyalkylamines which comprises reacting alkylene oxide with an aqueous solution of ammonia, the steps of maintaining the temperature between 10 and 30° C. during said reaction and the relative quantities of ammonia and alkylene oxide at thirty to one by weight, continuously removing the solution containing the hydroxyalkylamine product to the extent of .05% and excess ammonia, from the zone of said reaction, passing said solution to a heat interchanger to remove part of said ammonia, passing said solution from said heat interchanger to a column where the temperature of said solution is raised to 100° C. and the remainder of the excess ammonia is driven off, passing said solution from said column to a heat interchanger where its concentration is raised to 10 to 30%, passing concentrated solution from said second-mentioned heat interchanger to rectifying column to obtain crude concentrated hydroxyalkylamine, removing the steam from said second-mentioned heat interchanger, passing said steam through a turbo-compressor where it is adiabatically compressed to increase its temperature and pressure to such an extent that it will condense at 5 to 10° C. above its boiling point, passing said heated and compressed steam back to said second-mentioned heat interchanger to concentrate further solutions of product and removing the water condensed from said steam from said second-mentioned heat interchanger through a throttle valve, employing it to assist in the removal of ammonia in said first-mentioned heat interchanger, redissolving ammonia removed from said solution of the product, redissolving said recovered ammonia for further use and utilising the heat given up by said re-solution of ammonia to assist in removing ammonia from the solution in said first-mentioned heat interchanger.

HENRI MARTIN GUINOT.